UNITED STATES PATENT OFFICE.

ARCHIBALD K. LEE, OF GALVESTON, TEXAS, ASSIGNOR TO HIMSELF, GEORGE W. MIDDLETON, AND JOSEPH C. SMITH.

IMPROVEMENT IN PUTTING UP CAUSTIC ALKALIES.

Specification forming part of Letters Patent No. 158,094, dated December 22, 1874; application filed December 14, 1874.

*To all whom it may concern:*

Be it known that I, ARCHIBALD K. LEE, of the city and county of Galveston and State of Texas, have invented certain Improvements in Putting up Caustic Alkalies, of which the following is a full, clear, and exact description.

The object of my present improvement is to provide a simple, cheap, and reliable carrier for securing, in small and convenient packages for domestic use, and in which they can safely be transported, the hydrate alkalies of soda and potassa, commonly known as caustic soda and potassa, acids, salts, &c. The nature of my invention consists in coating paper or wood, first, with a composition consisting of white lead ground in oil, pulverized sulphur, and black oxide of manganese, and which compound I form into a cement that serves to stiffen the material which I use as a base, filling entirely the pores of the same, giving it strength, solidity, and toughness nearly equal to that of metal, and rendering the material positively impervious to moisture and other like destructive agents, and thus securely guards against all danger of the deliquescence of the alkali packed therein.

The paper or wooden base having been thus treated, my invention consists, next, in coating the same with a compound similar to that embraced in my application filed in the United States Patent Office, December 12, 1874, for preventing the corrosion of metals, and which consists of asphaltum, paraffine, black oxide of manganese, and soapstone, the first three ingredients being reduced to a liquid without heat, but simply by a product which I obtain from distilling crude turpentine at the lowest possible temperature, and in separating all the pyroligneous-acid water therefrom during the process of distillation, or while the turpentine is yet in vapor. This last composition renders the paper or wood positively impervious to the destructive action of the alkalies or other materials, no matter how caustic in their nature the same may be. The paper or wood thus treated I form into a carrier, which may be in the shape of a box or package of any desired form and dimensions.

The great advantages of my improvement are found not only in its cheapness and simplicity, but in the strength of the package, which will resist all wear and tear in transportation nearly equal to that of metal, and having this advantage over metal, it will not discolor the alkali packed therein, as metal invariably does. And, again, it guards against all danger of the deliquescence or caustic action of the alkali fully as well as, if not better than, metal. And, again, as there is something in the nature of the compositions used which acts rather to repel than attract the alkali or acid to the surface of the material of which the box is composed, the same is always free to be removed, and does not require to be melted or liquidized, as often is the case when the alkali or acids are packed in a metallic casing.

The construction and operation of my invention are as follows: In a suitable vessel I mix my first composition or cement, and which consists of white lead, oil, pulverized sulphur, and black oxide of manganese. This I prepare by first reducing the white lead and oil to a positive consistency. After this is done I add, and thoroughly mix and stir therein, in equal proportions, pulverized sulphur and black oxide of manganese, until a cement of the desired stiffness is produced. With this cement I coat any suitable paper, Manila paper being preferred, or wood. The paper or wood thus coated is allowed to dry. I then, in a suitable vessel, prepare my second composition, and which, as I have said, is the same as that embraced in my application filed in the United States Patent Office, December 12, 1874, for an anti-corrosive coating for metals, and which compound consists of asphaltum, paraffine, black oxide of manganese, and soapstone, used in about the following proportions, viz., asphaltum, sixty-five (65) parts; paraffine, twenty (20) parts; black oxide of manganese, five (5) parts; and soapstone, or its equivalent, ten (10) parts, the first three ingredients being liquidized without heat, but simply by being subjected to the action of the product which I obtain from crude turpentine distilled at the lowest possible degree of heat, and from which the pyroligneous-acid water has been liberated during the process of distillation, or while the turpentine was yet in vapor, and which product I propose to make the distinctive subject-matter of an independent application for Letters Patent of the United States.

To obtain this product the still should not, as is the common practice, be charged directly with the crude turpentine, but the same, having been previously properly liquidized in a suitable vessel or chamber, should be fed to the still in such quantities as will insure its vaporization at a degree of heat not exceeding, say, 225°. The turpentine vaporized at this degree of heat avoids all danger of destroying or burning out any of its valuable properties. The still used should be so connected with a separating-chamber that the turpentine, as rapidly as vaporized, will pass thereto, and where it will be separated from its pyroligneous-acid water by the specific gravity of the pyroligneous-acid water being much heavier than the turpentine, which will cause it to fall to the bottom of the separating-chamber, leaving the yet volatile turpentine floating on top, and from which it passes to the ordinary condensing-column, there to be condensed in the usual manner. The result is that, by this simple act of separating the pyroligneous-acid water from the turpentine while the water is yet in vapor, I obtain a product that is not the ordinary spirits of turpentine of commerce, but a pure oil of turpentine, far superior to the oil of turpentine recommended by the London and Dublin pharmacopœia for medicinal purposes, and which results from the redistillation of the ordinary spirits of turpentine over potash, and is recognized as the oil of terebinthinæ.

After the foregoing ingredients are so mixed as to become thoroughly incorporated together, the composition is applied to the previously-cemented paper or wood, and which may be done with a brush or by submerging the material therein. In the last composition fluid rubber may be substituted for the black oxide of manganese and used in the same proportion, the rubber having been reduced to a fluid without heat, but simply through the agency of the product hereinbefore referred to as being obtained from crude turpentine. The paper thus prepared has a strength, solidity, and toughness nearly equal to metal, and will stand nearly an equal degree of rough handling in transportation and use, besides possessing the decided advantages of being much lighter and cheaper. The paper or wood is now ready for use as a carrier for all alkalies and acids, and, owing to the treatment to which it has been subjected, is of such nature as will resist their caustic action, no matter how great the same may be, and securely guard against all danger of the deliquescence of the alkali or acid from moisture or other cause. This prepared paper or wood carrier, for convenience' sake, I form into a box or package; but it may be used simply as a close wrapper for the alkali. When I use a box it may be of any style, what is known to the trade as the "novelty box" being most admirably adapted for the purposes designed. The box form for the carrier, when constructed out of paper or wood prepared as hereinbefore stated, besides being the most convenient form for transportation, possesses the advantages of permitting me to do away with molds now used to form the alkali into suitable blocks before being incased or inclosed in the carrier, and which saves one step, and a most important one, in the process of packing the alkali. The invariable practice now is to pour the alkali hot, sometimes "red hot," into iron molds, and which, owing to its excessively caustic nature in this state, soon causes it to destroy the mold; and besides, when the loose caps are placed on the mold, the alkali in this state will ooze through, so as to leave the caps, as it were, hermetically sealed when the alkali cools and is in condition to be removed. To free these caps is both troublesome and laborious. With my box all this expense, labor, and difficulty I propose to avoid simply by breaking the cold alkali into small particles and filling the box with the same, and then filling in the interstices between the particles with liquid alkali melted at a low heat, and which, when cold, solidifies the entire contents into one common mass or block, and one which, as has before been stated, can readily, at pleasure, be removed, as there is something in the nature of the compositions used which serves to repel, rather than attract, the alkali to the surface of either the paper or wooden carrier, and which is not the case when the alkali is packed in a metallic box or case, as all who are familiar with the use of the alkali when inclosed in such carrier well know that to remove the same the box has almost invariably to be placed in hot water, so as to soften the alkalies.

I am well aware that iron and other metals, paper coated with bees-wax and resin, or melted tar and resin, or other carriers coated with resinous, tarry, and asphaltic wash, have been used for the purpose of securing caustic alkalies, acids, salts, and similar articles which are corrosive or deliquescent in their nature, in convenient packages for safe transportation and domestic use, all of which materials and processes I desire distinctly to disclaim.

What I claim as new, and desire to secure by Letters Patent of the United States, is—

The herein-described process of preparing paper and wood as a carrier for caustic alkalies, soda, and salts, which process consists of first coating the material with a composition or cement formed of white lead ground in oil, pulverized sulphur, and black oxide of manganese, and further coating the same with a composition consisting of asphaltum, paraffine, black oxide of manganese, and soapstone;

the asphaltum, paraffine, and black oxide of manganese being reduced to a fluid through the agency of a product obtained from crude turpentine distilled at a degree of heat not exceeding 225°, and from which the pyroligneous-acid water has been separated while the turpentine is in vapor, substantially as set forth.

In testimony whereof I have signed my name to this specification in the presence of two subscribing witnesses.

ARCHIBALD K. LEE.

Witnesses:
 EDWIN JAMES,
 JOS. T. K. PLANT.